US012688446B2

(12) United States Patent
Pakhomchik et al.

(10) Patent No.: US 12,688,446 B2
(45) Date of Patent: Jul. 21, 2026

(54) HYBRID QUANTUM COMPUTATION ARCHITECTURE FOR SOLVING A SYSTEM OF LINEAR BINARY RELATIONS

(71) Applicant: Terra Quantum AG, St. Gallen (CH)

(72) Inventors: Aleksey Pakhomchik, St. Gallen (CH); Michael Perelshtein, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 997 days.

(21) Appl. No.: 17/589,670

(22) Filed: Jan. 31, 2022

(65) Prior Publication Data

US 2022/0245498 A1 Aug. 4, 2022

(30) Foreign Application Priority Data

Feb. 2, 2021 (EP) ..................................... 21154851

(51) Int. Cl.
| | |
|---|---|
| *G06N 10/20* | (2022.01) |
| *G06N 5/04* | (2023.01) |
| *G06N 10/80* | (2022.01) |

(52) U.S. Cl.
CPC .............. *G06N 10/20* (2022.01); *G06N 5/04* (2013.01); *G06N 10/80* (2022.01)

(58) Field of Classification Search
None
See application file for complete search history.

(56) References Cited

U.S. PATENT DOCUMENTS

| | | |
|---|---|---|
| 2017/0351967 A1 | 12/2017 | Babbush et al. |
| 2020/0104740 A1 | 4/2020 | Cao |

FOREIGN PATENT DOCUMENTS

| | | |
|---|---|---|
| WO | WO 2019/005206 A1 | 1/2019 |
| WO | WO 2021/006992 A1 | 1/2021 |

OTHER PUBLICATIONS

O'Brien, et al., Calculating Energy Derivatives for Quantum Chemistry on a Quantum Computer, npj Quantum Information vol. 5 , Article No. 113, Dec. 11, 2019, pp. 1-12 (Year: 2019).*
Romero, et al., Strategies for Quantum Computing Molecular Energies Using the Unitary Coupled Cluster Ansatz, arXiv: 1701. 02691v2 [quant-ph], Feb. 10, 2018, pp. 1-18 (Year: 2018).*
McArdle, et al., Quantum Computational Chemistry, arXiv:1808. 10402v2 [quant-ph], Jan. 17, 2019, pp. 1-46 (Year: 2019).*
European Patent Office, Extended European Search Report in European Patent Application No. 21154851.6, dated Jul. 20, 2021.

* cited by examiner

*Primary Examiner* — Wilbert L Starks
(74) *Attorney, Agent, or Firm* — Fitch Even Tabin & Flannery LLP

(57) ABSTRACT
A method of driving a quantum computational network for finding a solution to a computational problem comprising a system of linear binary relations includes initializing computation qubits, applying a set of quantum gates and measuring an outcome state. A solution is determined based on a plurality of solution candidates, wherein a state of the register qubits is associated with a select one of the binary relations and a state of the ancilla qubits is associated with a solution candidate for the select one of the binary relations. The solution is then iteratively improved.

14 Claims, 7 Drawing Sheets initializing qubits in a qubit register — S10 applying a set of quantum gates to the computation qubits and measuring an outcome state — S12 determining a solution for a system of linear binary relations associated with the variational parameters θ based on a plurality of solution candidates for individual relations encoded in the outcome state — S14

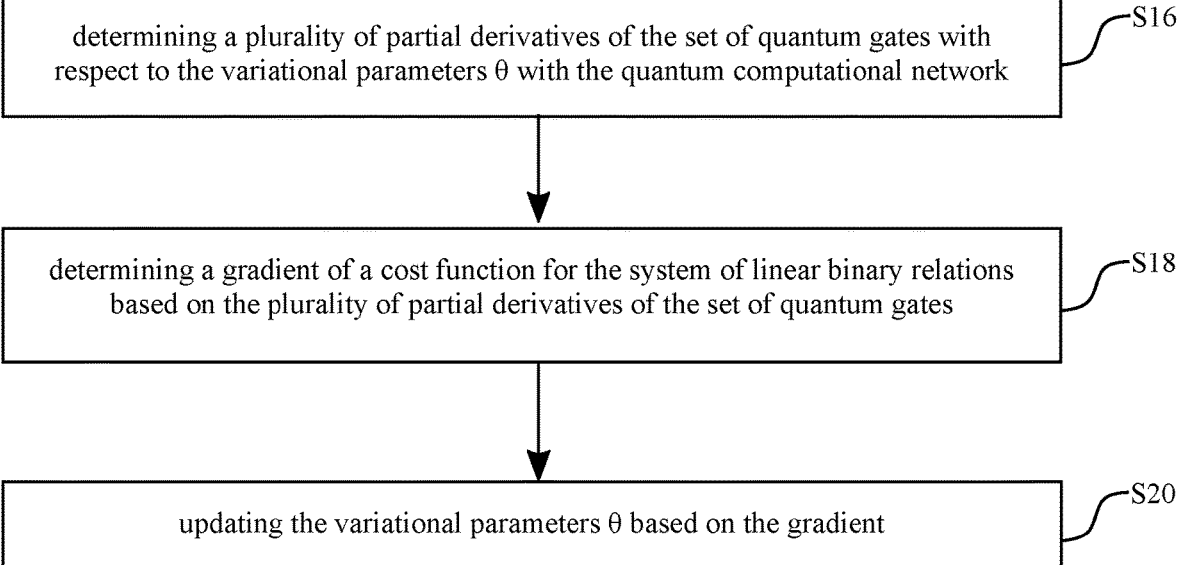

determining a plurality of partial derivatives of the set of quantum gates with respect to the variational parameters θ with the quantum computational network ⟶ S16 determining a gradient of a cost function for the system of linear binary relations based on the plurality of partial derivatives of the set of quantum gates ⟶ S18 updating the variational parameters θ based on the gradient ⟶ S20

Fig. 4

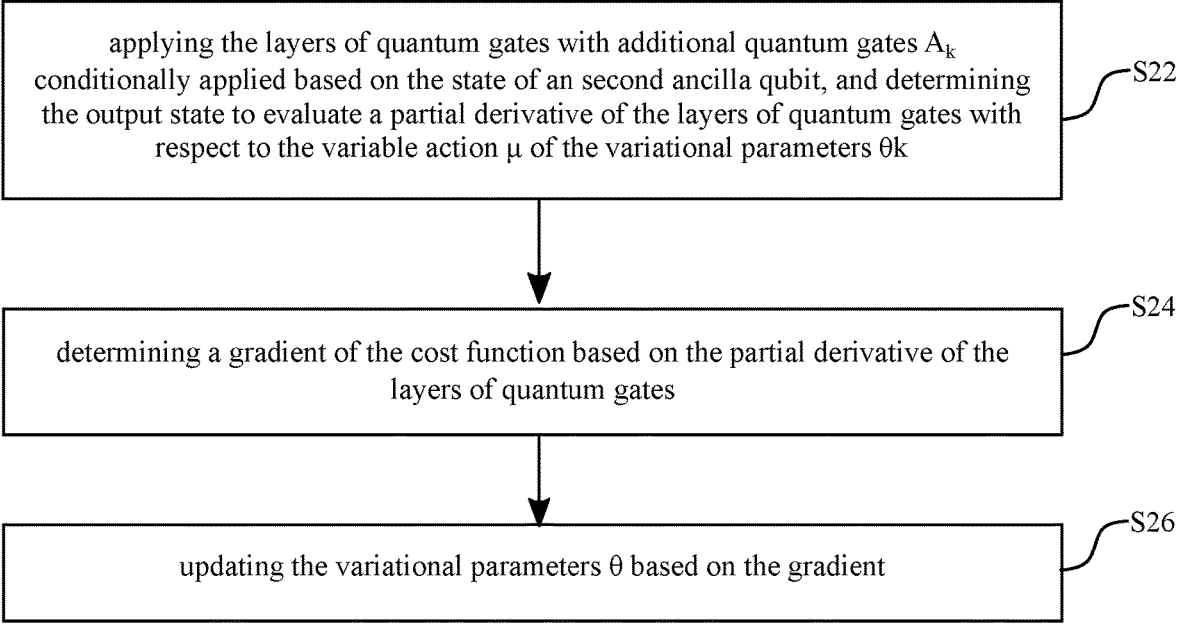

applying the layers of quantum gates with additional quantum gates $A_k$ conditionally applied based on the state of an second ancilla qubit, and determining the output state to evaluate a partial derivative of the layers of quantum gates with respect to the variable action $\mu$ of the variational parameters $\theta k$ ⌐S22 determining a gradient of the cost function based on the partial derivative of the layers of quantum gates ⌐S24 updating the variational parameters $\theta$ based on the gradient ⌐S26

Fig. 7A

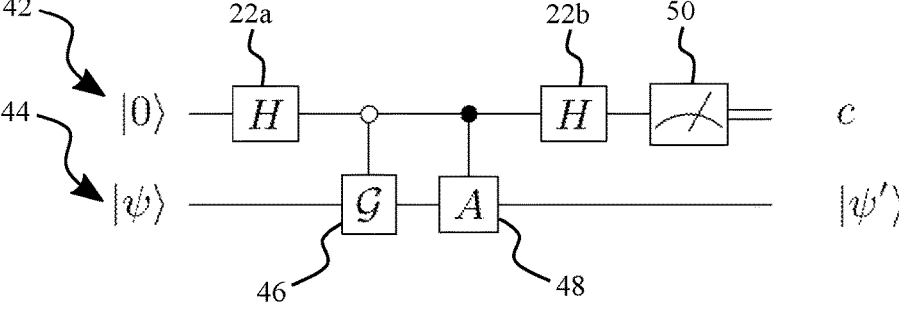

Fig. 7B

HYBRID QUANTUM COMPUTATION ARCHITECTURE FOR SOLVING A SYSTEM OF LINEAR BINARY RELATIONS

CROSS-REFERENCE TO RELATED APPLICATIONS

This patent application claims priority to European Patent Application No. 21154851.6, filed on Feb. 2, 2021, which is incorporated by reference herein.

FIELD OF THE DISCLOSURE

The present disclosure relates to quantum computation and, more specifically, to a quantum computation architecture for finding solutions to a system of linear binary relations.

BACKGROUND OF THE INVENTION

Quantum computers provide a platform of controllable quantum mechanical systems whose state and interaction can be controlled in order to perform a computation. The computation is realized by a deterministic evolution of the controllable quantum mechanical systems, and the state of the quantum mechanical systems can be measured to determine the outcome of the computation.

The quantum computer generally encodes information in so called qubits, acting as a quantum mechanical equivalent of classical bits. Qubits are physical systems whose quantum mechanical state can be (coherently) controlled and (substantially) preserved between two basis states during the time of a computation, in the following referred to as $|0\rangle$ and $|1\rangle$. As an example, a qubit may be implemented by encoding information in the spin state of an electron, e.g., in the electron being in an "up" state or a "down" state, but may also be encoded in a polarization state of a photon, in states of a (superconducting) oscillator, in energy levels of an atom, or the like.

Control operations on these qubits are termed Quantum gates. Quantum gates can coherently act on qubits for inducing changes of the state of a single qubit (so called single-qubit gates) and for acting on multiple qubits (so called multi-qubit gates), e.g., to entangle the states of the multiple qubits, and any combination thereof. For example, a single-qubit gate may induce a rotation of the spin state of an electron by a selectable value, e.g., $\pi/2$. A multi-qubit gate may coherently act on two or more qubits, such as a coherent CNOT operation on the state of two qubits. A plurality of quantum gates can be applied to the qubits of the quantum computer in parallel or in sequence for performing a computation. Finally, the state of the qubits may be measured repeatedly after applying a sequence of quantum gates to determine the probabilities for each possible outcome of the computation.

In order to compute solutions to problems which are considered intractable on classical computers, a quantum computer can leverage the special properties of quantum mechanical states, in particular the superposition and entanglement of different quantum states, to find solutions with a comparatively low number of calculation steps.

However, the superposition/entangled states of quantum mechanical systems are inherently volatile (e.g., suffer from decoherence) and the control and measurement of these systems is subject to fidelity margins, such that state-of-the-art quantum computers are currently limited both in the number of controllable quantum mechanical systems (qubits) as well as the number of successively performed control actions (quantum gates).

Hence, clever exploitation of quantum mechanical properties is generally necessary to perform useful computations within the technical constraints of a low qubit number and a short sequence of successive computational operations.

Google AI Quantum and Collaborators: "*Quantum Approximate Optimization of Non-Planar Graph Problems on a Planar Superconducting Processor*", preprint quant-ph/2004.04197 on arxiv.org, show the implementation of a quantum approximate optimization algorithm for discrete binary optimization problems, such as the MaxCut problem of a graph of connected vertices. The quantum processor applies a sequence of layers of quantum gates to a qubit register, and the control parameters are iteratively optimized based on classical feedback from a quadratic fit of multiple evaluations of the computation.

Tan et al.: "*Qubit-efficient encoding schemes for binary optimisation problems*", preprint quant-ph/2007.01774 on arxiv.org teach an encoding scheme for solving quadratic unconstrained binary optimisation (QUBO) type problems with variational quantum algorithms, wherein the classical binary variables of the optimization problem are compressed into computational basis states of a qubit register, i.e., states spanned by the tensor product of the states of the qubit register. The solution to the QUBO problem may be probed by measuring the conditional probability of measuring a certain state of an ancilla qubit and one of the computational basis states. The solution is optimized with a classical optimizer, with the best performance obtained via the COBYLA algorithm.

Schuld et al.: "*Evaluating analytic gradients on quantum hardware*", Physical Review A, 99(3) teach the evaluation of gradients of composite quantum gates by probing the outcome of an adjusted set of composite quantum gates to determine partial derivatives of the composite quantum gates with respect to single parameter gates in a series of unitary evolutions.

BRIEF SUMMARY OF THE INVENTION

However, the known systems and methods are limited by the hardware architecture and are mostly applied to toy problems for which solutions can be found on classical computers in a shorter or a comparable timeframe. For example, the implementation of a quantum algorithm by Google AI Quantum and Collaborators is limited to problems on a graph of 23 vertices matching the hardware geometry, or less. The algorithm proposed by Tan et al. can exponentially cut the number of required qubits for solving QUBO problems, such that problems with an exponentially higher number of vertices can be tackled. However, the scaling of the algorithm does not reliably find optimal solutions as it has a tendency to get stuck in local minima, likely due to the use of improper classical optimization algorithms. Moreover, the algorithms are specifically adapted to mathematical problems of the QUBO class. At the same time, the efficient solution of a system of linear relations in discrete variables could find improvements in several fields, such as cybersecurity.

In view of this state-of-the-art, the object of the invention is to provide an efficient quantum algorithm for solving a system of linear binary relations in polynomial time, with the potential for finding solutions to problems which are currently intractable on classical computers.

This object is solved by a method of driving a quantum computational network and a hybrid quantum computation system according to the independent claims. The dependent claims relate to preferred embodiments.

According to a first aspect, the invention relates to a method for finding a solution to a computational problem, the computational problem comprising a system of linear binary relations, with a hybrid quantum computation system. The system comprises a quantum computational network including a set of quantum gates. The set of quantum gates comprises a plurality of variational quantum gates with variable actions acting on a plurality of computation qubits of the quantum computational network. The variable actions form a set of variational parameters $\vec{\theta}$. The method comprises initializing the plurality of computation qubits, comprising a plurality of ancilla qubits and a plurality of register qubits, applying the set of quantum gates to the computation qubits and measuring an outcome state. The method further comprises determining a solution for the system of linear binary relations associated with the variational parameters $\vec{\theta}$ based on a plurality of solution candidates for the individual relations of the system of linear binary relations encoded in the outcome state. In the outcome state, a state of the register qubits is associated with a select one of the binary relations and a state of the ancilla qubits is associated with a solution candidate for the select one of the binary relations. The method also comprises iteratively improving the solution to the system of linear binary relations by a series of steps. The iterative method steps comprise determining a plurality of partial derivatives of the set of quantum gates with respect to the variational parameters $\vec{\theta}$ with the quantum computational network, and determining a gradient of a cost function for the system of linear binary relations based on the plurality of partial derivatives of the set of quantum gates. The cost function associates a cost to a solution candidate for the system of linear binary relations encoded in the outcome state of the computation qubits. The cost comprises an individual relation penalty associated with a mismatch between the sides of each of the relations and an inconsistency penalty associated with a clash of the value of the same variable in different linear binary relations after repeatedly measuring the computation qubits. The iterative method steps further comprise updating the variational parameters $\vec{\theta}$ based on the gradient.

The method of driving the quantum computational network can determine a solution to the system of linear binary relations with a heuristic method similar to the operation of a neural network. The variational parameters $\vec{\theta}$ can encode an initial (random) guess, and the outcome of the evaluation of the quantum computational network with the variational parameters $\vec{\theta}$ can be measured to determine a corresponding solution, wherein a set of register qubits can act as pointers to a certain relation out of the system of linear binary relations, and wherein a set of ancilla qubits can act as a pointer to one of a predefined set of solutions to the respective relation.

Hence, the problem can be encoded with a small number of qubits which may scale only logarithmically with the number of relations. The outcome can be measured several times to determine the solution associated with the variational parameters $\vec{\theta}$.

Based on the solution, a cost function associated with the system of linear binary relations may be classically evaluated to attribute a cost to the solution, or in other words, a measure is calculated of how good the solution is. The cost function can attribute the relation penalty to each measured outcome state for the computation qubits of the quantum computational network and can consolidate a plurality of outcome states with the system of linear binary relations through the inconsistency penalty to harness the entanglement of the computation qubits. The cost function may be minimized by iteratively improving the variational parameters $\vec{\theta}$ according to the measured gradient of the cost function.

By iteratively improving the solution through updating the variational parameters $\vec{\theta}$, in a manner which may be similar to a gradient descent for a neural network, the quantum computational network progressively approaches an optimized solution.

Specifically, the quantum computational network is optimized by determining partial derivatives with respect to the variational parameters $\vec{\theta}$ with the quantum computational network, i.e. based on a direct measurement of an outcome state of the quantum computational network. A gradient of the cost function can then be determined based on the measured partial derivatives and the cost function through classical computation, in the following referred to as measured gradient of the cost function.

The optimization of the solution according to the gradient of this cost function was found by the inventors to be effective at finding an efficient solution to the system of linear binary relations in the above described architecture. In other words, based on the described architecture/encoding, the quantum computational network was found to converge towards a configuration in which the outcome describes an efficient solution to the system of linear binary relations after iterative improvement of the initial guess according to the gradient of the cost function. Surprisingly, the Inventors found that updating the variational parameters $\vec{\theta}$ based on the measured gradient of the cost function can be effective also in the case where the solution, and therefore also the problem, is compressed into the computational basis states of the qubits, allowing to exponentially reduce the number of computation qubits for the quantum computational network.

As a result, a quantum architecture is designed which balances out the shortcomings of the prior art, such that the computation may be performed with comparatively low qubit number while still efficiently finding solutions to complex problems in polynomial time. The method may therefore define a hybrid computation architecture, wherein function evaluations as well as partial derivative estimation can be computed on realistic quantum hardware implementing the quantum computational network, while a relationship between measured values and the problem may be determined on classical hardware.

The skilled person will appreciate that the term "quantum computational network" should not be understood to be limited to a linked (physical) network, but may rather refer to the action of a plurality of quantum gates (e.g. organized into layers) on the qubits in a sequence and/or in parallel to link the states of the qubits via multi-qubit operations. In other words, the network may be established through a concatenation of quantum gates acting on the computation qubits and links in the network may arise due to multi-qubit gates entangling multiple qubits.

To evaluate the quantum computational network, the qubits can be initialized into an initial state, such as the ground state of each qubit. In some embodiments, after initialization of the qubits into their ground states, superposition states of each computation qubit are prepared, e.g. via the application of Hadamard gates.

The set of quantum gates may then act on the computation qubits to link the computation qubits in the quantum computational network, with the action of the (variational) quantum computational network being parametrized by the variational parameters $\vec{\theta}$. The set of quantum gates may comprise a plurality of layers of quantum gats, which may each comprise a cumulative action of a plurality of coherent operations on the state of the computation qubits, and which may be applied to the computation qubits in sequence, e.g. one layer after another. The cumulative action of the coherent operations in one layer should generally act on all computation qubits which are involved in the computation, or in other words, a layer of quantum gates should directly affect the state of all computation qubits. Each layer should comprise at least one multi-qubit gate and at least one variational quantum gate (which in principle could be the same gates). Preferably, both the multi-qubit gates and the variational gates of a layer directly act on the state of all computation qubits. At the same time, the layer may be temporally or structurally constricted, e.g., a layer in a sequence of coherent operations may be defined by the shortest sequence of quantum gates which fulfills the criteria of acting on the majority or all computation qubits used in the computation and including at least one variational quantum gate, preferably a number of variational quantum gates substantially corresponding to the number of computation qubits, or multiples thereof. The skilled person will appreciate that a plurality of the quantum gates in a layer may be applied in parallel to the qubits to shorten the sequence of coherent operations on the state of the computation qubits in a layer. The subsequent application of a plurality of layers of quantum gates to the computation qubits may then form the quantum computational network.

After the layers of quantum gates have acted on the computation qubits, the computation qubits can be measured to obtain a characteristic outcome of the quantum computational network with respect to the initial state.

The measurement of the ancilla and register qubits may project the complex quantum mechanical state of the register qubits onto a computational basis of the computation qubits, such that one of the computational basis states is measured as an outcome. The computational basis states may be orthogonal basis states of the Hilbert space spanned by the tensor product of the basis states of each computation qubit in the measurement basis.

Repeating the measurement may allow finding the (conditional) probabilities of each outcome of the computation for the variational parameters $\vec{\theta}$. For example, for each quantum computational network (parametrized by the variational parameters $\vec{\theta}$) the $N_q$ computation qubits may be measured $\approx 2^{N_q}$ times to approximate the outcome state.

Since the number of evaluations may exponentially increase with the number of qubits, it may be advantageous to utilize a minimum number of qubits to encode the problem.

In preferred embodiments, the computation qubits comprise log N register qubits and m ancilla qubits, wherein the system is a system of N linear binary relations, with each of the N linear binary relations having at most m different variables.

In other words, the problem may be encoded by encoding pointers to the N relations into the states of a number of $N_{rq}$=log (N) register qubits, such that the number of evaluations may only scale polynomially with the number of relations for a sparse matrix having at most m different variables in each relation. The solution to that relation may then be encoded in the ancilla qubits.

The relations and solutions are preferably encoded into the computational basis states of the computation qubits, e.g., into the computational basis states of the register and ancilla qubits, respectively. The computational basis states of the register and ancilla qubits may then point at a relation and a corresponding solution for the m variables in that relation, respectively, to encode the problem of finding a solution to the (sparse) system of linear binary relations.

For example, if two register qubits each have basis states |0> and |1> in the basis of measurement, the computational basis states may be |00>, |01>, |10> and |11>, and each of the computational basis states may be associated to one of the relations, e.g. the first, second, third and fourth relation of the system of binary relations. In other words, N relations may be represented by the computational basis states of $N_{rq}$=log (N) register qubits.

The solution to a relation with at most m binary variables may be represented by the computational basis states of m ancilla qubits. For example, if the relations each have two variables, the computational basis state |00> may point at the solution for both variables being zero, etc., such as to construct a predefined correspondence between a measured state and an associated set of solutions for the m variables of that equation.

The skilled person will appreciate that the m variables may be different in the N relations. For example, in the example above, the first relation may depend on the variables $x_1$, x2, the second relation may depend on the variables x2, x3, etc., and the state may of the ancilla qubits may describe the solution for different variables depending on the state of the register qubits. As a result, a solution to a sparse system of four relations having up to five variables with at most two variables per relation may be encoded in a quantum computational network with only four computation qubits.

In preferred embodiments, the computational basis states of the ancilla qubits are associated with all possible solution candidates for the m variables in the respective linear binary relation associated with the state of the register qubits.

The skilled person will appreciate that the method for solving a system of linear binary relations also solves a system of linear discrete relations, since an $N_{bit}$-bit discrete number can be expressed through the values of $N_{bit}$ binary values, e.g. using the computational basis states of $N_{bit}$ ancilla qubits.

In preferred embodiments, the method further comprises determining a maximum number of variables m in each of the N linear binary relations.

The maximum number of variables m may be determined classically to obtain an encoding of a given system of linear binary relations into a minimal number of computation qubits.

The "solution", i.e., the quantum computational network's guess for the solution, encoded in the measured outcome state of the computation qubits can then be weighted according to the cost function which can be used to determine a feedback to the quantum computational network.

In preferred embodiments, the individual relation penalty is a continuous and non-negative function of the mismatch between the sides of each of the relations, wherein the individual relation penalty is in particular an even polynomial of the mismatch, and preferably based on the squared mismatch.

For example, in the case of a system of $N_{rel}$ linear equations with $N_{var}$ variables $x_k$ of the form $$\sum\nolimits_{k=1}^{N_{var}} a_{k,i}x_k - b_i = 0,$$

with being $a_{k,i}$ coefficients by which the variables $x_k$ are multiplied and $b_i$ being a constant, the individual relation cost for each equation may be proportional to the square of the mismatch between the sides of the equations $$\left(\sum\nolimits_{k=1}^{N_{var}} a_{k,i}x_k - b_i\right)^2.$$

In the case of a system of linear inequalities, e.g. of the form $$\sum\nolimits_{k=1}^{N_{var}} a_{k,i}x_k - b_i < 0,$$

the individual relation cost for each equation may be proportional to the expression $$f\left(\sum\nolimits_{k=1}^{N_{var}} a_{k,i}x_k - b_i\right)^2,$$

where $f(y)$ has the property of being zero if $y<0$ and of being equal to y for $y>0$, or vice-versa, e.g. when the inequality is of the form $$\sum\nolimits_{k=1}^{N_{var}} a_{k,i}x_k - b_i > 0.$$

In other words, in the case of an inequality in the system of linear binary relations, the mismatch may be defined by a function $f(y)$ for that inequality, which takes into account the respective kind of inequality, e.g., whether the inequality is of the form $y<0$, $y>0$, $y\leq0$, or $y\geq0$. In some examples, a constant may be added to the mismatch depending on whether the inequality is of the form $y<0$, $y>0$, or of the form $y\leq0$, or $y\geq0$, such as to penalize the case of $y=0$ in the first form. The solution candidates for the linear relations may therefore be weighted according to a quadratic cost function, having the advantageous properties of being continuous, differentiable and non-negative, such as to facilitate finding the solution with the quantum computational network. For example, the individual relation cost may be $$\left(\sum\nolimits_{k=1}^{N_{var}} a_{k,i}x_k - b_i\right)^2 \text{ or } \text{Log}\left(\left(\sum\nolimits_{k=1}^{N_{var}} a_{k,i}x_k - b_i\right)^2\right).$$

In preferred embodiments, the cost comprises the calculation of the cost expression C $$C=C_{rel}+\lambda C_{inc}$$

wherein $C_{rel}$ is the individual relation cost, wherein $C_{inc}$ is the inconsistency penalty, and
wherein $\lambda$, is a parameter chosen such that for a given system of linear binary relations the term $\lambda C_{inc}$ is larger than $C_{rel}$ on average for random variational parameters $\vec{\theta}$.

The inventors found that the inconsistency penalty should be scaled to be larger than the sum of the individual relation costs for a random (bad) solution to prevent the quantum computational network from getting stuck in local minima with conflicting relations. In other words, the inconsistency penalty may enforce consistent values for the variables in the solutions of all relations, and the parameter $\lambda$ should therefore be scaled to prevent conflicting solutions for the same variable in different relations.

The parameter $\lambda$ may depend and be selected based on the size of the system of binary linear relations, the number of variables in each relation, and/or the number of shared variables between the relation. Preferably, the quantum computational network is simulated/evaluated for a number of different random variational parameters $\vec{\theta}$ to determine the relative magnitude of $C_{inc}$ and $C_{rel}$, and $\lambda$ is selected based on the cost associated with the outcomes, such that $\lambda C_i$, is larger than $C_{rel}$ on average.

In some embodiments, the parameter $\lambda$ is empirically determined, such as by setting $\lambda$ to an initial constant value, e.g. 1, and by progressively increasing $\lambda$ until a consistent solution of the relations is found, when the solution comprises conflicting solutions for the individual relations, or by progressively decreasing $\lambda$ when the solution does not converge towards a correct solution.

In preferred embodiments, the inconsistency penalty is based on the probability of measuring different outcome states of the same variable when determining the state of the same variable based on the state of the computation qubits for different states of the register qubits.

For example, the inconsistency penalty $C_{inc}$ may be based on the expression $$C_{inc} = \sum_{j=0}^{N_{var}-1}\left(1 - \prod_{i\in I_j, j=f(i,k)} P(x_{f(i,k)} = 1) - \prod_{i\in I_j, j=f(i,k)} P(x_{f(i,k)} = 0)\right),$$

wherein $I_j$ is the subset of linear binary relations comprising the same variable $x_j$ and $f(i, k)$ is a predetermined mapping between a state of the ancilla qubits and the associated solution for the same variable $x_j$ in a relation i encoded in the state of the register qubits, the associated solution for the same variable $x_j$ being associated with index k in the relation i, for a number of $N_{var}$ variables, and $P(x_j=1/0)$ is the probability of measuring the outcome state of the kth ancilla qubit corresponding to a value of $1/0$ in the relation i.

The above expression may be compatible with an optimization strategy according to the measured gradient of the cost function, e.g. the gradient of the inconsistency penalty $C_{inc}$ may be determined based on the partial derivatives of the quantum computational network. In addition, the inconsistency penalty may be minimal for binary probabilities, i.e. solutions in which the probability of obtaining 1 or 0 is close to $1/0$ and may therefore improve convergence towards a binary solution.

However, the skilled person will realize that other forms of $C_{inc}$ may be selected in practice which may equally provide a non-negative and continuous cost function for penalizing conflicting solutions of the same variable in different relations, e.g. based on the conditional probabilities of obtaining different outcomes, such as a cost proportional to $\Sigma_{i,l \in I_j, i\neq l} P(x_{f(i,j)}=1)P(x_{f(l,j)}=0)$.

In preferred embodiments, the system of relations is a system of N linear binary equations each having at most m different variables, wherein the individual relation cost $C_{rel}$ is in particular based on the expression $$C_{rel} = \sum_{i=0}^{N-1} \sum_{S=0}^{2^m-1} |\gamma_{iS}(\theta)|^2 \left( \sum_{k=0}^{m-1} a_{i,f(i,k)} s_k - b_i \right)^2 ,$$

wherein $|\gamma_{iS}(\vec{\theta})|^2$ is the probability of measuring a state S of the ancilla qubits for a given state i of the register qubits, wherein the state i is associated with a certain linear equation i, wherein $a_{i,f(i,k)}$ is the coefficient by which the kth variable in the linear equation i is multiplied, wherein $s_k \in \{0,1\}$ in accordance with the solution candidate associated with state S, and wherein $b_i$ is a constant value of the linear equation i.

For example, for a linear equation with two variables, the solutions of the linear equations may be encoded into the $2^2$ computational basis states of the ancilla qubits $|00>, |01>$, $|10>$ and $|11>$. Continuing the example, the state S may be formulated as $$S = \sum_{k=0}^{m-1} s_k * 2^k ,$$

i.e. $S \in \{0, 1, 2, 3\}$, and may therefore act as a pointer from the four computational basis states to a solution of the relation, in which the kth variable has the state $s_k$.

The mismatch of the sides of the equation with the solution determined from the state of the ancilla qubits may then be squared and multiplied with the probability $|\gamma_{iS}(\vec{\theta})|^2$ to measure the state S for determining the individual relation cost $C_{rel}$.

In the case of a linear binary inequality, the individual relation cost $C_{rel}$ may be based on the similar expression $$C_{rel} = \sum_{i=0}^{N-1} \sum_{S=0}^{2^m-1} |\gamma_{iS}(\theta)|^2 f \left( \sum_{k=0}^{m-1} a_{i,f(i,k)} s_k - b_i \right)^2 ,$$

where $f(y)$ has the property of being zero, if the solution fulfills the inequality, and of being equal to y, if the solution does not fulfill the inequality.

The skilled person will appreciate that the system of linear binary relations may comprise both equations and inequalities, and the respective associated cost function may apply accordingly.

The skilled person will appreciate that the computational problem may comprise additional constraints, which may be codified as an additional cost.

For example, for a knapsack problem, the problem may comprise the constraint to maximize a linear function of the variables $x_k$, such as $$\text{``}\max\left(\sum_{k=1}^{N_{var}} c_k x_k\right)\text{''},$$

with $c_k$ being coefficients and $N_{var}$ being the number of variables in the system of linear binary relations, or a subset thereof. This additional constraint may be encoded in the method by including the cost $$C_{max} = -f\left(\sum_{k=1}^{N_{var}} c_k x_k\right),$$

which may be added to the cost C described above to include the constraint in the feedback, wherein $f(y)$ may be an odd function, such as y=x. Hence, the method may also be for finding a solution to a computational knapsack problem.

The cost function should generally be expressible in terms of the probabilities of measuring a certain outcome of the computation qubits, such as to enable the determination of the gradient of the cost function based on the partial derivatives of the quantum computational network with respect to the variational parameters $\vec{\theta}$.

The partial derivatives of the quantum computational network with respect to the variational parameters $\vec{\theta}$ can be determined based on a direct measurement of the outcome of applying the quantum computational network to the computation qubits, or in other words, the partial derivatives can be determined with the quantum computational network.

In preferred embodiments, determining the partial derivative of the set of quantum gates with respect to the variational parameters $\vec{\theta}$ with the quantum computational network comprises:

applying the set of quantum gates with shifted variational parameters $\vec{\theta}*$, the shifted variational parameters $\vec{\theta}*$ comprising a subset of the variational parameters $\vec{\theta}$ shifted by a shift and determining the associated outcome state for the shifted variational parameters $\vec{\theta}*$ to evaluate a partial derivative with respect to the subset of the variational parameters $\vec{\theta}$; and/or conditionally applying the set of quantum gates and additional quantum gates $A_k$ based on the state of a derivation ancilla qubit, the additional quantum gates fulfilling the equation $$\partial_{\theta_j} G = \sum_{k=1}^K \alpha_k A_k ,$$

with K being a real positive value, and determining the outcome state in order to evaluate a partial derivative of the set of quantum gates with respect to the variable action $\theta_j$ of the variational parameters $\vec{\theta}$.

When the variational gates have two eigenvalues, the partial derivative of the outcome $f$ of applying the quantum computational network to the initial state of the computation qubits with respect to the variational quantum gates with variational parameter $\theta_j$ may be evaluated based on the outcome states for the shifted variational parameters $\vec{\theta}*$ according to $\partial_{\theta_j} f = r(f(\theta_j+s) - f(\theta_j-s))$, wherein the shift $$s = \frac{\pi}{4r},$$

with r being the eigenvalues of the variational quantum gate.

The subset of the variational parameters $\vec{\theta}$ may be a single variational parameter, i.e. the partial derivatives may be determined with respect to each variational gate, or may be a plurality of the variational parameters $\vec{\theta}$. Hence, the partial derivatives of the quantum computational network may be calculated directly by evaluating the outcome of the same quantum computational network architecture as the one used for determining a solution, such that the architecture of the quantum computational network may be simplified.

In preferred embodiments, the method comprises sequentially applying the layers of quantum gates with shifted variational parameters $\vec{\theta}*$ twice for each variational gate, the shifted variational parameters $\vec{\theta}*$ comprising a subset of the variational parameters $\vec{\theta}$ shifted by symmetric shifts for each variational gate, to evaluate a partial derivative with respect to each variable action of the variational parameters $\vec{\theta}$ for determining the gradient before updating the variational parameters $\vec{\theta}$.

In preferred embodiments, the two eigenvalues of the variational quantum gates are $\pm\frac{1}{2}$ and the shift is $\pm\pi/2$.

For single-qubit gates with the eigenvalues $\pm\frac{1}{2}$, e.g., one-qubit rotation generators in $\frac{1}{2}\{\sigma_x, \sigma_y, \sigma_z\}$, the shift should be $\pm\pi/2$. Single qubit rotations are native to most implementations of quantum computers, have two eigenvalues, and often feature higher fidelity than multi-qubit gates. Hence, with the variational gates being single-qubit rotations, the partial derivatives may be determined with higher accuracy than for the case of variational multi-qubit gates.

However, in general, the variational gates need not have only two eigenvalues. Instead, the variational gates may also feature more than two eigenvalues. The partial derivative of the quantum computational network may then still be obtained by evaluating the quantum computational network by adding an ancilla qubit and performing an adjusted quantum computation which features the additional quantum gates $A_k$ acting on the computation qubits conditionally on the state of the ancilla qubit. A Hadamard gate may bring the ancilla qubit into a superposition state and the variational quantum gate G or the additional quantum gates $A_k$ may act on the qubits depending on the state of the ancilla. The outcome of the quantum computation and the state of the ancilla may then be measured to obtain the expectation values $E_0$ and $E_1$ for the state of the ancilla being $|0\rangle$ and $|1\rangle$, respectively, with probabilities $p_0$ and $p_1$ for each of the additional quantum gates $A_k$. The partial derivative may then be determined according to $$\partial_{\theta_j} f = \sum_{k=1}^{K} \alpha_k 2(p_0 E_0 - p_1 E_1)|_k.$$

The efficiency of the gradient descent may depend on the accuracy of the gradient. While it may in principle be possible to evaluate the partial derivatives of the quantum computational network only with respect to a portion of the variational parameters $\vec{\theta}$/variational gates, it may therefore be advantageous to evaluate the partial derivatives of the quantum computational network for each variational parameter of the variational parameters $\vec{\theta}$ individually, for each step of optimizing the variational parameters $\vec{\theta}$.

For example, for each step of "gradient descent" towards the optimal solution the quantum computational network may be evaluated $2*T*2^{N_q}$ times, i.e. twice for each variational parameter T and $2^{N_q}$ times in order to estimate the outcome of each evaluation in the computational basis of the $N_q$ qubits.

In preferred embodiments, the variational parameters $\vec{\theta}$ are updated based on an update function of a moving average over the gradient of the cost and of a moving average over the squared gradient of the cost.

The update of the variational parameters $\vec{\theta}$ based on the update function of the moving average over the gradient of the cost function and of the moving average over the squared gradient of the cost function, will in the following referred to as "adaptive moment based update function".

As the adaptive moment based update function depends on the moving average over the gradient of the cost function and the (element) square of the moving average over the gradient of the cost function, the update of the variational parameters $\vec{\theta}$ may be smoothed by first order and second order moments of the gradient, enabling the descent towards an optimized solution. The update based on the adaptive moment based update function was found by the inventors to outperform approaches based on (gradient free) classical optimizers, such as the one used in Tan et al.

Preferably, the update function is substantially proportional to the moving average over the gradient of the cost function and substantially inversely proportional to the square root of the moving average over the squared gradient of the cost function, and the moving average over the gradient of the cost function and of a moving average over the squared gradient of the cost function are most preferably exponentially decaying moving averages.

In preferred embodiments, the update function at an iterative step t is mathematically equivalent to:

$$\vec{\theta}_{t+1} = \vec{\theta}_t - \frac{\alpha}{\sqrt{v_t} + \epsilon} m_t$$

with $m_t$ being proportional to the moving average over the gradient of the cost function and $V_t$ being proportional to the moving average over the squared gradient of the cost function, $\alpha$ being a learning rate hyperparameter, and $\epsilon$ being a small number with respect to an expected magnitude of the update.

For example, $\epsilon$ may be $10^{-8}$, and $\alpha$ may be 0.01, such that $\epsilon$ is smaller than the expected magnitude of the update by a factor of $10^6$.

Preferably, $$m_t = \frac{\beta_1 m_{t-1} + (1-\beta_1)\nabla C|_{\vec{\theta}=\vec{\theta}_t}}{1-\beta_1^t} \quad \text{and}$$

$$v_t = \frac{\beta_1 v_{t-1} + (1-\beta_2)\left(\nabla C|_{\vec{\theta}=\vec{\theta}_t}\right)^2}{1-\beta_2^t},$$

with $\beta_1$ and $\beta_2$ being real values between 0 and 1, $\nabla C|_{\vec{\theta}=\vec{\theta}_t}$ being a gradient determined at iterative step t based on the outcome state for the shifted variational parameters $\vec{\theta}*$, and $$\left(\nabla C|_{\vec{\theta}=\vec{\theta}_t}\right)^2$$

being the element square of the gradient determined at iterative step t, while $m_{t-1}$ and $v_{t-1}$ are the previously determined values at time step t-1 of $m_t$ and $v_t$, respectively, and $m_0$ and $v_0$ are zero.

The quotients $1-\beta_1{}^t$ and $1-\beta_2{}^t$ may be understood as bias correction terms for correcting an initialization bias of the initial values of $m_t$ and $V_t$ being initialized to zero (i.e. at t=0), such that $m_t$ and $v_t$ may be exponentially decaying moving averages of the gradient/square of the gradient of the cost function, respectively, with the rate of decay being given by $\beta_1$ and $\beta_2$. For example, $\beta_1$ and $\beta_2$ may be selected as 0.9 and 0.999, respectively.

The inventors found that the adaptive moment based update function can significantly improve the performance of the quantum computational network as compared to other gradient descent algorithms. It is believed that the update function advantageously acts upon the gradient component by using the exponential moving average of gradients $m_t$ to overcome the noise in the quantum system, while at the same time advantageously acting on the learning rate component by dividing the learning rate a by the exponential moving average of squared gradients $v_t$ to optimize the update magnitude in view of the landscape of the cost function imposed onto the variational quantum computational network.

In preferred embodiments, the set of quantum gates comprises a plurality of layers of quantum gates applied in sequence, wherein the plurality of layers comprise the same arrangement of quantum gates in each layer.

In preferred embodiments, the layers of quantum gates comprise the same arrangement of quantum gates in each layer and wherein the quantum gates in each layer in particular comprise a plurality of multi-qubit quantum gates which together act on all computation qubits.

The layers may contain the same or different types of quantum gates and may be applied sequentially to the computation qubits. For example, each layer may feature the same architecture of quantum gates while different elements of the variational parameters $\vec{\theta}$ may apply to the variational gates of the layer. In other words, the layers may feature the same quantum gate architecture, but the action of the quantum gates on the qubits in each layer may differ based on the variational parameters $\vec{\theta}$.

In preferred embodiments, each layer of quantum gates comprises a set of variational quantum gates acting on each computation qubit, wherein the set of variational quantum gates is in particular a set of variational single qubit gates.

By applying a variational quantum gate to each computation qubit in each layer, the number of layers for converging towards a solution may be reduced, such that the quantum computation architecture may be performed with a shorter sequence of quantum gates and may be less sensitive to noise.

In preferred embodiments, the number of variational quantum gates in each layer is substantially equal to the number of computation qubits.

The inventors found that by limiting the number and/or types of variational gates may avoid the complexity of the cost function landscape may be constrained to enable convergence towards an optimized solution. In some embodiments, an advantageous compromise may be found by providing a set of variational quantum gates acting on each computation qubit in each layer of quantum gates while the number of variational quantum gates in each layer is substantially equal to the number of computation qubits.

According to a second aspect, the invention relates to a hybrid quantum computation system for finding a solution to a system of linear binary relations. The system comprises a quantum computational network comprising a plurality of computation qubits, including a plurality of register qubits and ancilla qubits, and a set of quantum gates selectively acting on the computation qubits including multi-quantum gates acting on multiple computation qubits, wherein the quantum gates comprise a plurality of variational quantum gates with respective variable actions onto the computation qubits, wherein the variable actions form a set of variational parameters $\vec{\theta}$. The system further comprises a control system configured to initialize the computation qubits, and to apply the set of quantum gates to the computation qubits with the variational parameters $\vec{\theta}$ for determining an outcome state. The control system is further configured to determine a partial derivative of the set of quantum gates with respect to at least one of the variational parameters $\vec{\theta}$ with the quantum computational network, and to determine a gradient of a cost function based on the partial derivative, wherein the cost function associates a cost to a solution encoded in the outcome state. A state of the register qubits is associated with a select one of the binary relations and a state of the ancilla qubits is associated with a solution candidate for the select one of the binary relations. The cost comprises an individual relation penalty associated with a mismatch between the sides of each of the relations and an inconsistency penalty associated with a clash of the value of the same variable in different linear binary relations after repeatedly measuring the computation qubits. The system is then configured to update the variational parameters $\vec{\theta}$ based on the gradient.

According to a third aspect, the invention relates to a computer program or computer program product comprising machine readable instructions, which when the computer program is executed by a processing unit cause the processing unit to implement a method according to the first and/or the second aspect and/or to implement a system according to the third aspect, e.g. by sending control instructions to a control system of a quantum computer and/or a specialized quantum computational network and/or by processing measurement outcomes received by the quantum computer and/or the specialized quantum computational network.

BRIEF DESCRIPTION OF THE SEVERAL VIEWS OF THE DRAWING(S)

The features and numerous advantages of the method and hybrid quantum computation system according to the present invention will best be understood from a detailed description of preferred embodiments with reference to the accompanying drawings, in which:

FIG. 1 schematically illustrates an example of a hybrid quantum computation system;

FIG. 4 illustrates an example of a flow diagram of a method for iteratively improving a solution to a computational problem with a quantum computational network;

Figure 6A:
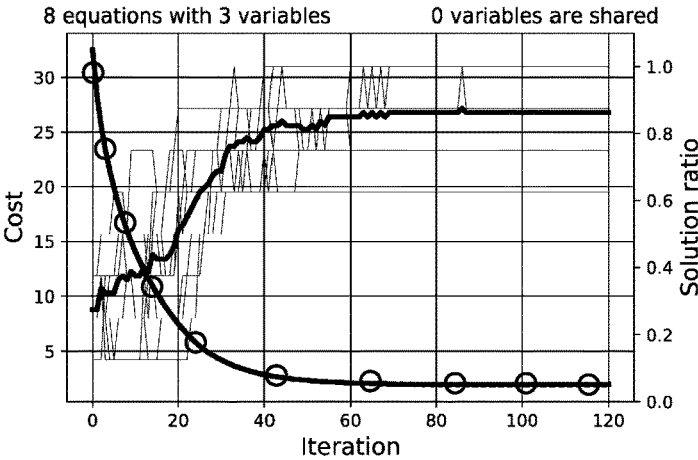
Figure 6B:
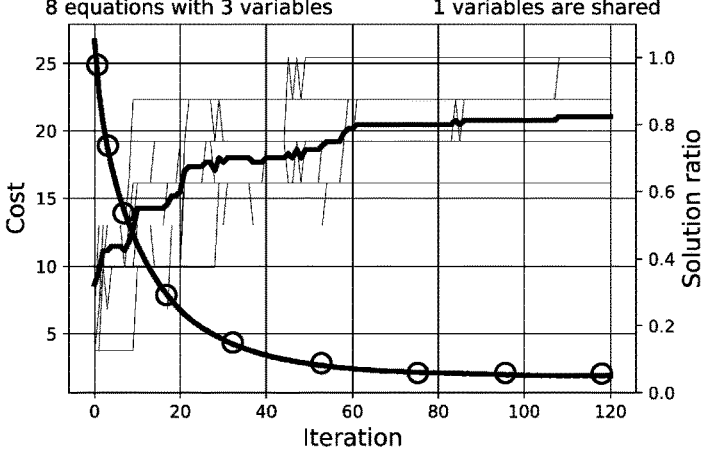
Figure 6C:
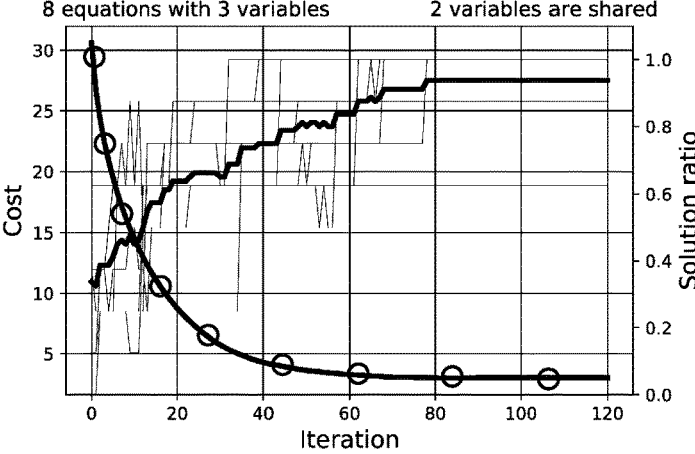

FIG. 6A-C illustrate diagrams of the simulated performance of the hybrid quantum computation architecture for solving a system of linear binary equations; and FIG. 7A, 7B illustrate another example of a flow diagram of a method for iteratively improving a solution a quantum computational network and a corresponding portion of a quantum computational architecture.

DETAILED DESCRIPTION OF THE INVENTION

Figure 1:
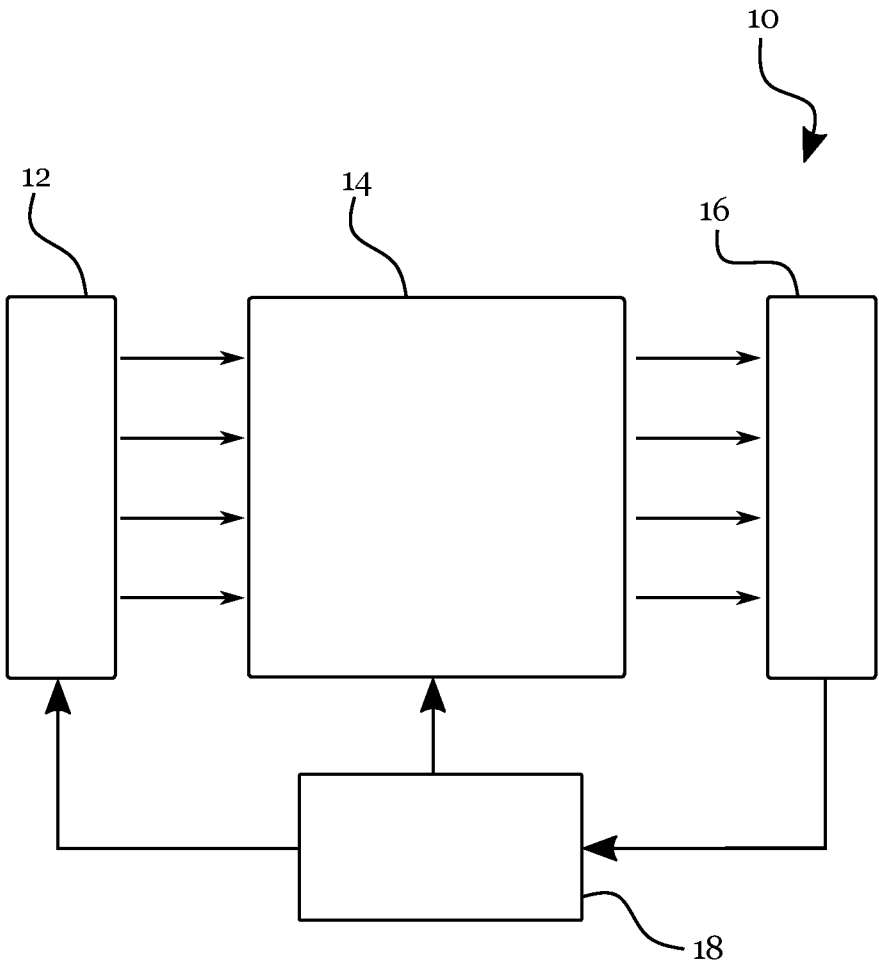

FIG. 1 schematically illustrates an example of a hybrid quantum computation system 10 for implementing and driving a quantum computational network. The system 10 comprises a qubit register 12 comprising a plurality of qubits. A plurality of quantum gates 14 may act on the qubits of the qubit register 12 to perform a computation. The outcome of the computation may be measured by a measurement sensor 16 which projects the states of the qubits onto the computational basis states of the hybrid quantum computation system 10. The outcome can be received by a control system 18.

The control system 18 may be configured to repeatedly perform a computation sequence. The computation sequence may comprise initializing the qubits of the qubit register 12 before each computation, such as into the ground state of each qubit, e.g., to form an initial state of the qubits of $|00 . . . 0>$. The control system 18 may then apply the plurality of quantum gates 14 to the qubits of the qubit register 12 to drive a coherent evolution of the qubits. Initially, the control system 18 may produce superposition states of all qubits, e.g., by applying a Hadamard gate to each of the qubits, and may subsequently apply the plurality of quantum gates 14 including variational quantum gates with variable actions. Following the coherent evolution, the state of the qubits in the qubit register 12 may be measured with the sensor 16. On the basis of the measured result, the control system 18 can classically calculate an "energy"/"cost" of the solution with a cost function of the problem to be solved.

The control system 18 may then repeat the computation sequence with adjusted variable actions based on the outcome, such as to progressively improve the solution a system of linear binary relations associated with the measured outcome. Specifically, the control system 18 may repeat the computation sequence with adjusted operation parameters for the variational quantum gates in order to determine a gradient of the plurality of quantum gates 14 from the measured outcomes and may update the variable actions based on the estimated gradient in order to progressively adjust the quantum computational network towards an improved solution.

The control system may comprise a single control unit or may comprise a plurality of control units which may be functionally connected. The control units may comprise a microcontroller, an ASIC, a PLA (CPLA), an FPGA, a quantum processing unit, or other control device, including control devices operating based on software, hardware, firmware, or a combination thereof. The control devices can include an integrated memory, or communicate with an external memory, or both, and may further comprise interfaces for connecting to sensors, devices, appliances, integrated logic circuits, other control systems, or the like, wherein the interfaces may be configured to receive or send signals, such as electrical signals, optical signals, wireless signals, acoustic signals, or the like.

The plurality of quantum gates 14 may be arranged into layers of similar or identical structure, and the control system 18 may subsequently apply the layers of quantum gates 14 with their respective variational parameters. Preferably, each layer comprises multi-qubit gates for entangling a plurality or all of the states of the qubits, and variational quantum gates affecting the state of all qubits.

Figure 2:
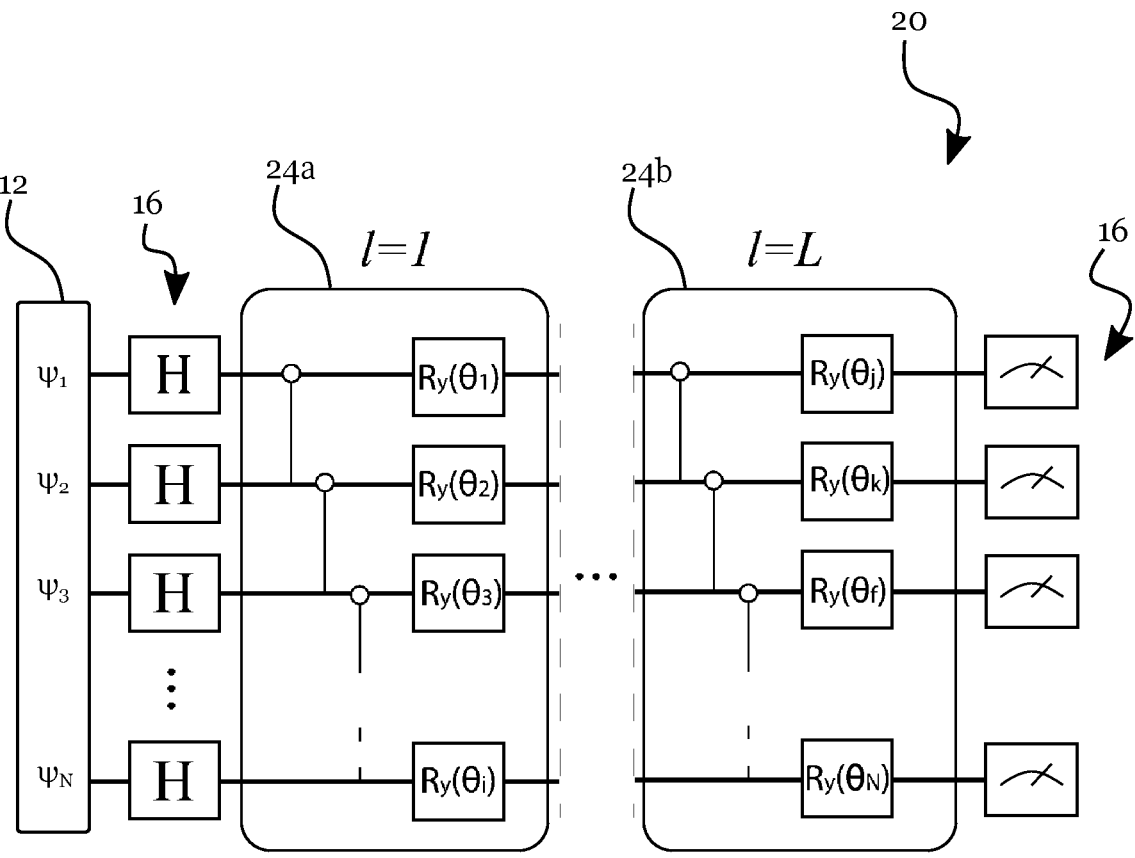
FIG. 2 illustrates an example of a quantum computational network 20 with a plurality of quantum gates.

FIG. 2 illustrates an example of a quantum computational network 20 with a plurality of quantum gates 14. The quantum computational network 20 comprises a qubit register 12 including a plurality of qubits with states $\Psi_1$-$\Psi_N$, and the evolution of each qubit state is illustrated as horizontal lines extending horizontally from the qubit register 12 towards the measurement sensors 16.

The qubits may be initially initialized into their ground states, e.g. $|0>$. The plurality of quantum gates 14 may comprise a plurality of Hadamard (H) gates 22 acting on each qubit of the qubit register 12 after the qubits have been initialized to prepare each qubit in a superposition state. The quantum computational network 20 may then comprise a plurality of L layers 24a, 24b of quantum gates 14 with equal structure, wherein the layers represent a plurality of quantum operations on the qubits in the qubit register 12, which are subsequently applied.

Each layer 24a, 24b comprises a plurality of multi-qubit gates, e.g. CNOT gates (depicted as vertical lines and hollow circles on the respective horizontal line of the "control qubit"). Further, in each layer 24a, 24b variational single qubit gates drive single qubit rotations $R_y(\theta)$ of each qubit around axis y with variable angles $\theta_i$. The variational angles $\theta_1$-$\theta_N$ across all layers 24a, 24b form a set of variational parameters $\vec{\theta}$ of the quantum computational network 20. The quantum computational network 20 depicted in FIG. 2 with L layers 24a, 24b and N qubits features L*N variable actions (angles) as variational parameters of $\vec{\theta}$, wherein each layer 24a, 24b comprises a plurality of two-qubit gates acting on all pairs of neighboring qubits of the qubit register 12 and the variable actions may drive variable single qubit rotations of each qubit in each layer 24a, 24b.

The skilled person will appreciate, that the arrangement of gates in FIG. 2 is for illustrative purposes only and suitable geometries of the quantum computational network 20 may differ from the depicted representation. For example, in FIG. 2, the CNOT gates acting on neighboring pairs of qubits act on the qubits in a (temporal) sequence. However, in preferred embodiments, a plurality of multi-qubit gates may be applied to the qubits in parallel, e.g. in two sequential applications of two-qubit gates acting on odd/even numbered pairs of neighboring qubits in parallel.

Following the application of the layers 24a, 24b of quantum gates 14 onto the qubits, the state of the qubits may be measured by the measurement sensors 16. The measurement sensors 16 may be a plurality of single qubit state detectors for measuring the state of each qubit following the evolution according to the plurality of quantum gates 14. Repeating the measurement may allow determining the probability of each measurement outcome and the result may be employed for finding a solution to a system of linear binary relations.

Figure 3:
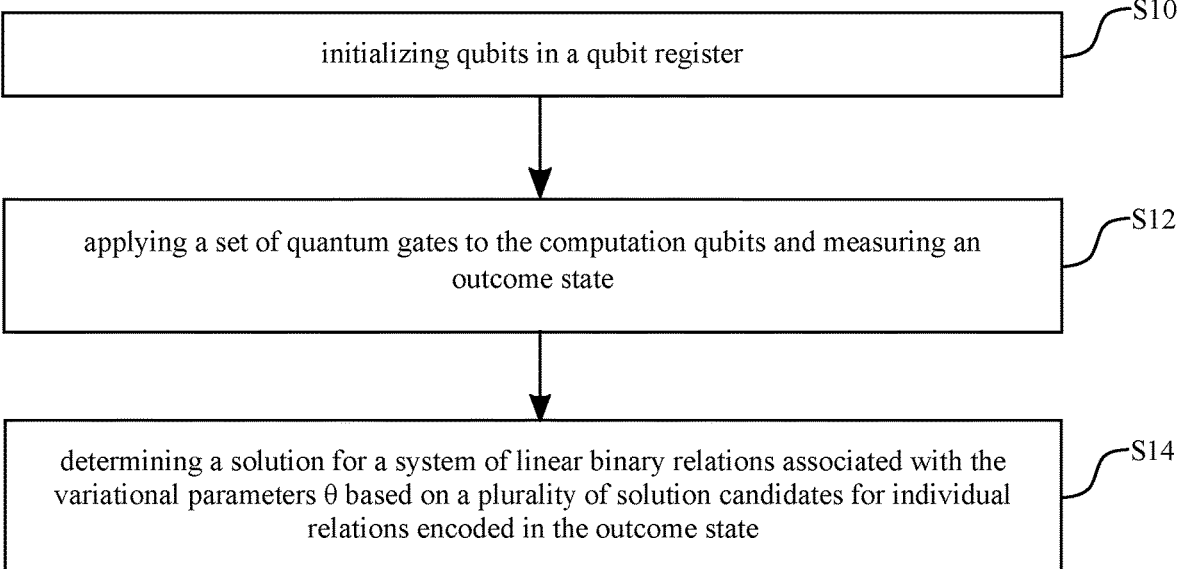
FIG. 3 illustrates an example of a flow diagram of a method for obtaining a solution to a system of linear binary relations.

FIG. 3 illustrates an example of a flow diagram of a method for obtaining a solution to a system of linear binary relations. The method comprises initializing qubits in a qubit register 12 (S10), and applying a set of quantum gates 14 to the computation qubits and measuring an outcome state (S12). The method further comprises determining a solution for the system of linear binary relations associated with the variational parameters $\vec{\theta}$ based on a plurality of solution candidates for the individual relations of the system of linear binary relations encoded in the outcome state (S14).

The variational parameters $\vec{\theta}$ may be variational angles $\theta_i$ of single qubit rotations $R_y(\theta_i)$ as illustrated in FIG. 2 or other variational parameters of the variational quantum gates parametrized by respective variational parameters $\theta_i$ of $\vec{\theta}$. The outcome state may be derived from the state of each qubit in the measurement basis and may be associated with a solution of the system of linear binary relations. Specifically, the measured state of the register qubits can be associated with a select one of the binary relations and the measured state of the ancilla qubits can be associated with a solution candidate for the select one of the binary relations.

For example, for two register qubits having basis states |0> and |1>, the computational basis states of the register qubits may be |00>, |01>, |10> and |11>, and each of the computational basis states may be associated to one of four relations. Accordingly, the method may be suitable to find solutions to a system of linear binary relations with 4 relations, when the qubit register comprises two register qubits, and generally for a problem with $2^N$ relations for a number of N register qubits.

Continuing the example, for two binary variables in each of the relations, the computational basis states of two ancilla qubits may represent the values of the two variables in the relation described by the register qubits as a tuple of results, e.g. the computational basis states may point at one of the solutions $\{(0,0), (0,1), (1,0), (1,1)\}$. As a result, when each of the relations have at most m binary variables, the solution to the $2^N$ relations may be encoded in m ancilla qubits.

The relationship between the encoded variables and the solution may be obtained by measuring the conditional probabilities of measuring a certain register state of the register qubits and the state of at least one ancilla qubit. For example, for m ancilla qubits and N relations, the final outcome state may be given by $$|\psi(\vec{\theta})\rangle = \sum_{i=0}^{N-1} \sum_{S=0}^{2^m-1} \gamma_{iS}(\vec{\theta})|s_0 s_1 \ldots s_{m-1}\rangle \otimes |i\rangle \qquad (1)$$

where the first state in the sum is the state of the ancillary qubits $s_0$-$s_1$ and the state |i> corresponds to the computational basis states of the register qubits. The sampling of this state can give components of a classical solution associated with state S of the ancilla qubits for the relation associated with state i of the register qubits as the probability P(i, S)=$|\gamma_{iS}(\vec{\theta})|^2$.

As an example, the ancilla qubits may each describe the value of one of the variables, e.g., the state $s_k$ of the kth ancilla qubit may describe the value of the kth variable. The probability that the kth variable in relation i has the value 1 may then be obtained according to $$P(x_{f(i,k)} = 1) = \frac{\sum_{S_k} |\gamma_{iS}(\vec{\theta})|^2}{\sum_{S=0}^{2^m-1} |\gamma_{iS}(\vec{\theta})|^2} \qquad (2)$$

where the set of states $S_k$ is all states S of the ancilla qubits with the property that the state of the kth ancilla qubit $s_k$ corresponds to "1", and where $f(i,k)$ is a mapping to the kth variable $x_j$ of the relation i.

Accordingly, the measurement of the states of the qubits in the qubit register 12 after applying the layers 24a, 24b of quantum gates 14 may be used to obtain (initially random) solutions to the system of linear binary relations.

The quantum computational network 20, i.e. the variational parameters $\vec{\theta}$ parametrizing the action of the quantum computational network 20 onto the qubits, may then be optimized in a feedback loop with the goal of minimizing the "energy"/"cost" associated with the solution.

FIG. 4 illustrates an example of a flow diagram of a method for iteratively improving a solution to a computational problem with a quantum computational network 20. The method comprises determining a plurality of partial derivatives of the set of quantum gates 14 with respect to the variational parameters $\vec{\theta}$ with the quantum computational network 20 (S16), determining a gradient of a cost function for the system of linear binary relations based on the plurality of partial derivatives of the set of quantum gates 14 (S18), and updating the variational parameters $\vec{\theta}$ based on the gradient (S20).

In order to determine the partial derivative of the layers 24a, 24b of quantum gates 14 with respect to the variational parameters $\vec{\theta}$, the method may comprise applying the layers 24a, 24b of quantum gates 14 with shifted variational parameters $\vec{\theta}*$. The shifted variational parameters $\vec{\theta}*$ may comprise a subset of the variational parameters $\vec{\theta}$ shifted by a shift. Specifically, for a variational gate with two eigenvalues $\pm\frac{1}{2}$ (e.g. single qubit rotation according to Pauli generator matrix, as in the example of FIG. 2) and a variable action $\theta_j$, the shift may be $\pi/2$. The partial derivative of the outcome $f$ according to the evolution of the qubit register 12 in the quantum computational network 20 with respect to the variable action $\theta_j$ may then be determined according to according to $$\partial_{\theta_j} f = \frac{1}{2}(f(\theta_j + \pi/2) - f(\theta_j - \pi/2)). \qquad (3)$$

Hence, if the cost function for the system of linear binary relations is a differentiable function of the outcome state, the variational parameters $\vec{\theta}$ of the quantum computational network 20 may be optimized towards a solution with a lower cost based on a gradient of the cost function determined from the partial derivatives of the layers 24a, 24b of quantum gates 14.

For the sake of illustration, the method will be explained in detail for the example of a system of N linear equations with a total number of $N_{var}$ different variables in the form of $$\sum_{j=0}^{N_{var}-1} a_{i,j} x_j = b_i, \qquad (4)$$

wherein $a_{i,j}$ is the coefficient by which the jth variable in the linear equation i is multiplied, and wherein $b_i$ is a constant value of the linear equation i. It will be assumed that the coefficient matrix $a_{i,j}$ is sparse, such that each equation has at most m non-zero coefficients. Accordingly, the linear system of equations may be rewritten as $$\sum_{k=0}^{m-1} a_{i,f(i,k)} x_{f(i,k)} = b_i, \tag{5}$$

Using this notation, a differentiable and non-negative individual relation cost $C_{rel}$ associated with all of the N equations may be obtained based on the expression $$C_{rel} = \sum_{i=0}^{N-1} \sum_{S=0}^{2^m-1} |\gamma_{iS}(\vec{\theta})|^2 \left(\sum_{k=0}^{m-1} a_{i,f(i,k)} s_k - b_i\right)^2, \tag{6}$$

wherein $|\gamma_{iS}(\vec{\theta})|^2$ is the probability of measuring a state S of the ancilla qubits for a given state i of the register qubits, wherein the state i is associated with a certain linear equation i, wherein $s_k \in \{0, 1\}$ in accordance with the solution candidate associated with state S, e.g. the value associated with the state of the kth ancilla qubit, and wherein $b_i$ is a constant value of the linear equation i.

However, the resulting individual relation cost $C_{rel}$ merely optimizes the equations individually without accounting for shared variables between relations, which may be considered a result of the encoding of the outcome into a comparatively small number of qubits. In order to link the cost function to the correlated system of equations, the Inventors included a second cost term as an inconsistency penalty $C_{inc}$ to increase the cost of outcome states with conflicting values for the same variables. As an example, the inconsistency penalty $C_{inc}$ may be based on the expression $$C_{inc} = \sum_{j=0}^{N_{var}-1} \left(1 - \prod_{i\in I_j, j=f(i,k)} P(x_{f(i,k)} = 1) - \prod_{i\in I_j, j=f(i,k)} P(x_{f(i,k)} = 0)\right), \tag{7}$$

wherein $I_j$ is the subset of linear binary relations comprising the same variable $x_j$, $f(i, k)$ is a predetermined mapping between a state S of the ancilla qubits and the associated solution for the same variable $x_j$ in a relation i (encoded in the state of the register qubits), the associated solution for the same variable $x_j$ being associated with index k in the relation i, for a number of $N_{var}$ variables, and $P(xj=1/0)$ is the probability of measuring the outcome state of the kth ancilla qubit corresponding to a value of 1/0 in the relation i.

Since $P(x_j=1/0)$ may be expressed in terms of the probabilities of measuring a certain state of the computation qubits according to Equation (2) above, the inconsistency penalty $C_{inc}$ may be used for determining a gradient which is determined based on the partial derivatives of the outcome states towards an improved solution of the system of linear binary relations.

A cost function for determining how good a solution is may then be based on the expression $$C=C_{rel}+\lambda C_{inc} \tag{8}$$

wherein $\lambda$ is a parameter chosen such that for a given system of linear binary relations the term $\lambda C_{inc}$ is larger than $C_{rel}$ on average for random variational parameters $\vec{\theta}$.

The gradient of the cost function may be obtained from the partial derivatives of the quantum computational network 20 with respect to the variational parameters $\theta_q$ according to $$\partial_{\theta_q} C = \tag{9}$$

$$\partial_{\theta_q} C_{rel} + \lambda\partial_{\theta_q} C_{inc} = \sum_{i=0}^{N-1} \sum_{S=0}^{2^m-1} |\gamma_{iS}(\vec{\theta})|^2 \left(\sum_{k=0}^{m-1} a_{i,f(i,k)} s_k - b_i\right)^2 \partial_{\theta_q}\left(|\gamma_{iS}(\vec{\theta})|^2\right) -$$

$$\lambda \sum_{j=0}^{N_{var}-1} \left(\sum_{p\in I_j} \partial_{\theta_q} P(x_{f(p,k)} = 1) \prod_{i\in I_j, i\neq p, j=f(i,k)} P(x_{f(i,k)} = 1) +\right.$$

$$\left.\sum_{p\in I_j} \partial_{\theta_q} P(x_{f(p,k)} = 0) \prod_{i\in I_j, i\neq p, j=f(i,k)} P(x_{f(i,k)} = 0)\right),$$

where, in accordance with Equation (2), $\partial_{\theta_q} P(x_{f(p,k)}=1)$ may be determined according to $$\partial_{\theta_q} P(x_{f(i,k)} = 1) = \partial_{\theta_q}\left(\frac{\sum_{S_k} |\gamma_{iS}(\vec{\theta})|^2}{\sum_{S=0}^{2^m-1} |\gamma_{iS}(\vec{\theta})|^2}\right), \tag{10}$$

$\partial_{\theta_q}(|\gamma_{iS}(\vec{\theta})|^2)$ may be determined based on the result of the outcome state $|S>\otimes|p>$ with shifted variational parameters $\vec{\theta}*$ symmetrically shifted by $\pi/2$ according to $$\partial_{\theta_q}\left(|\gamma_{iS}(\vec{\theta})|^2\right) = \partial_{\theta_q}\left(\langle\psi(\vec{\theta})|(|S\rangle\langle S| \otimes |p\rangle\langle p|)|\psi(\vec{\theta})\rangle\right) = \tag{11}$$

$$\frac{1}{2}(\langle\psi(\theta_q + \pi/2)|(|S\rangle\langle S| \otimes |p\rangle\langle p|)|\psi(\theta_q + \pi/2)\rangle -$$

$$\langle\psi(\theta_q - \pi/2)|(|S\rangle\langle S| \otimes |p\rangle\langle p|)|\psi(\theta_q - \pi/2)\rangle)$$

in accordance with Equation (3).

In other words, the gradient of the cost function may be determined based on the measured outcome of the quantum computational network 20 for shifted variational parameters $\vec{\theta}*$, wherein the partial derivatives of the cost function are based on the probabilities of measuring the computational basis states of the qubit register 12 for the shifted variational parameters $\vec{\theta}*$.

The gradient may then be used to update the variational parameters $\vec{\theta}$ towards an optimized solution. To improve the convergence based on the measured gradient of the cost function determined in this way the variational parameters $\vec{\theta}$ may be updated according to an adaptive moment based update function.

The adaptive moment based update function may update the variational parameters $\vec{\theta}$ based on an update function of a moving average over the measured gradient of the cost function and of a moving average over the squared measured gradient of the cost function. In particular, the variational parameters $\vec{\theta}$ may be updated according to the function $$\vec{\theta}_{t+1} = \vec{\theta}_t - \frac{\alpha}{\sqrt{v_t} + \epsilon} m_t$$

with $m_t$ being proportional to the moving average over the gradient of the cost function and $v_t$ being proportional to the moving average over the squared gradient of the cost function, $\alpha$ being a learning rate hyperparameter, e.g., 0.01, and $\in$ being a small number with respect to the expected magnitude of the update, e.g. $10^{-8}$.

The moving average may exponentially decay and may be determined iteratively according to $$m_t = \frac{\beta_1 m_{t-1} + (1 - \beta_1)\nabla C|_{\vec{\theta}=\vec{\theta}_t}}{1 - \beta_1^t}$$

and $$v_t = \frac{\beta_2 v_{t-1} + (1 - \beta_2)\left(\nabla C|_{\vec{\theta}=\vec{\theta}_t}\right)^2}{1 - \beta_2^t},$$

with $$\nabla C|_{\vec{\theta}=\vec{\theta}_t}$$

being the gradient determined at iterative step t based on the outcome state for the shifted variational parameters $\vec{\theta}*$, and $$\left(\nabla C|_{\vec{\theta}=\vec{\theta}_t}\right)^2$$

being the element square of the gradient determined at iterative step t, while $m_{t-1}$ and $v_{t-1}$ are the previously determined values of $m_t$ and $v_t$ at time step t-1, respectively, and $m_0$ and $v_0$ are zero.

The skilled person will appreciate that the quotients $1-\beta_1^t$ and $1-\beta_2^t$ can be understood as bias correction terms for correcting an initialization bias of the initial values of $m_t$ and $v_t$ being initialized to zero (i.e. at t=0), such that $m_t$ and $v_t$ may be exponentially decaying moving averages of the gradient/square of the gradient of the cost function, respectively, with the rate of decay being given by $\beta_1$ and $\beta_2$. For example, $\beta_1$ and $\beta_2$ may be selected as 0.9 and 0.999, respectively.

The inventors found that the adaptive moment based update function can significantly improve the network performance and was found to be superior to both simple moving averages of the gradient as well as adaptive learning rate algorithms individually.

In some embodiments, determining the updated set of variational parameters $\vec{\theta}$ based on the update function may incorporate a stochastic element, e.g. by stochastically selecting a subset of the variational parameters $\vec{\theta}$ in each iteration for determining partial derivatives and estimating the gradient based on the stochastically selected subset of the variational parameters $\vec{\theta}$ similar to a stochastic gradient descent. Accordingly, the time for updating the variational parameters $\vec{\theta}$ may be reduced as compared to a determination of the partial derivatives for all variational parameters $\vec{\theta}$.

In some embodiments, additional penalties may be added to the cost function for cost function regularization, or the magnitude of the change of the variational parameters $\vec{\theta}$ may be bounded, to incorporate additional constraints to the solution or reducing the complexity of finding an optimized solution.

By iteratively repeating the method illustrated in FIG. 4, the variational parameters $\vec{\theta}$ should be optimized towards optimized variational parameters $\vec{\theta}$, wherein the associated measured outcome of applying the quantum computational network 20 to the qubits of the qubit register 12 (the solution) features a lower (minimal) cost according to the cost function. Accordingly, the solution to a system of linear binary relations may be found with a quantum computational network 20.

Figure 5:
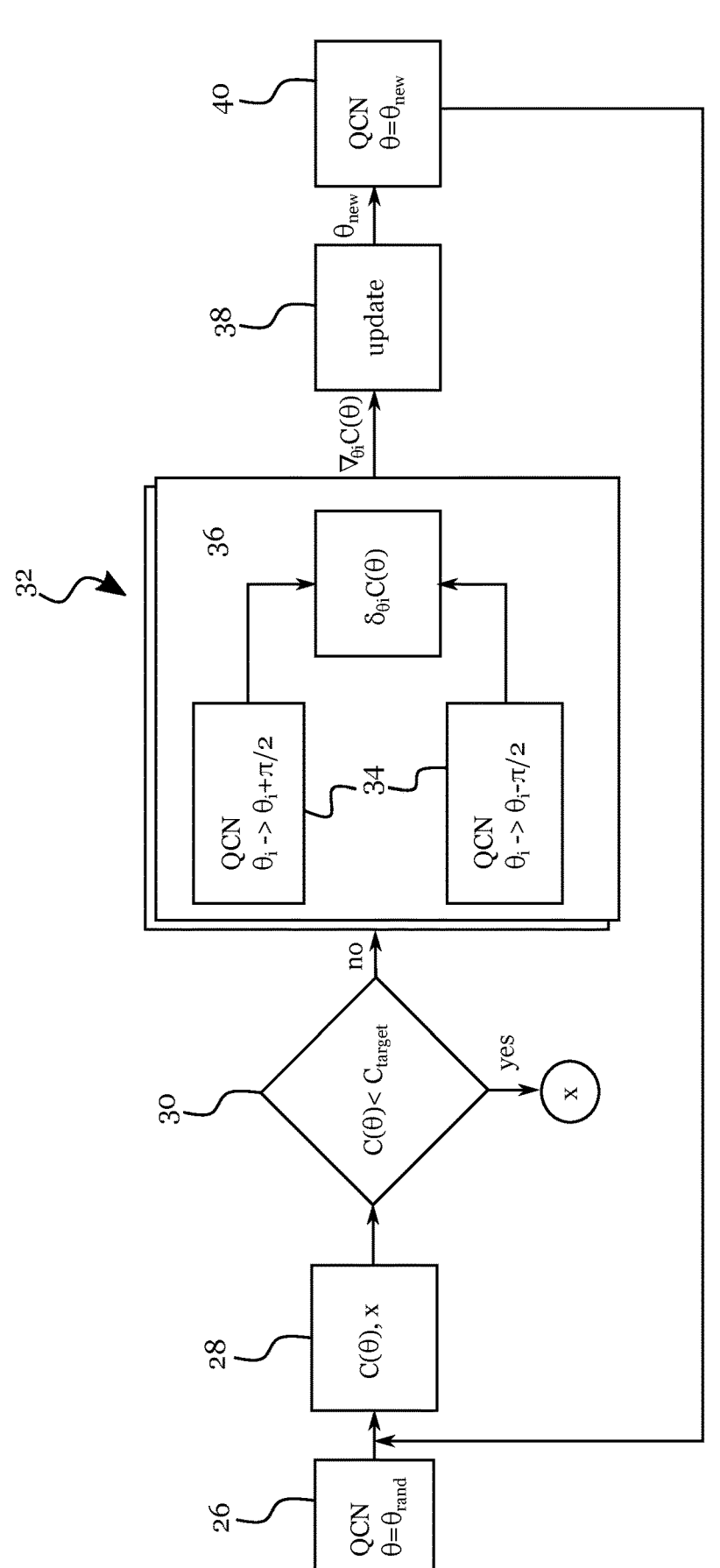
FIG. 5 illustrates a flow chart of an iterative method for improving a solution to a computational problem with a quantum computational network.

FIG. 5 illustrates a flow chart of an iterative method for improving a solution to a computational problem with a quantum computational network 20 similar to the quantum computational network 20 illustrated in FIG. 2, which may apply the methods according to FIGS. 3 and 4.

Initially, the quantum computational network 20 may be evaluated with random variational parameters $\theta_{rand}$ in an initial quantum computational network evaluation 26 which may be running on a quantum computer. The resulting outcomes may then be analyzed by a cost function evaluation module 28 which may be running on a classical computer to determine a cost associated with the (initially random) variational parameters $\vec{\theta}$. The cost may be passed to a convergence/threshold evaluation module 30 which may be running on the same classical computer comparing the cost to a target cost $C_{target}$ or checking whether the cost/ solution converges based on previous iterations. If the cost is below the threshold or has converged, the method may output the classical solution corresponding to the outcome of the evaluation of the quantum computational network 20 for the variational parameters $\vec{\theta}$. Preferably, the convergence/ threshold evaluation module 30 checks whether all variables of the most probable solution have the same value and whether this solution satisfies all relations.

If the system has not arrived at a convergence criterion, e.g. when the system of binary linear relations has not been solved or when the cost has not converged or is above the threshold, a hybrid gradient evaluation 32 may be performed. The hybrid gradient evaluation 32 comprises evaluations 34 of the quantum computational network 20 for shifted variational parameters $\vec{\theta}$ which may be running on a quantum computer, wherein the variable actions $\theta_j$ are individually shifted by symmetric shifts, and the outcomes are passed to a partial derivative evaluation module 36, which may be running on a classical computer, and which computes the partial derivatives of the cost function with respect to the respective variable action $\theta_j$. The hybrid gradient evaluation then outputs a measured gradient of the cost function to an update module 38, to update the variational parameters $\vec{\theta}$ based on the measured gradient of the cost function.

The quantum computational network quantum 20 with the updated variational parameters $\theta_{new}$ may then be evaluated in a quantum computational network evaluation 40 which may be running on a quantum computer which (quantum mechanically) determines outcomes of the quantum computational network 20 for the updated variational parameters $\theta_{new}$. The outcome of the quantum computational network evaluation 40 may be passed to the cost function evaluation module 28 and the convergence/threshold evaluation module 30 to iteratively repeat an optimization process until the cost of the outcome converges or is below a predefined threshold.

FIG. 6A-6C illustrate three diagrams of the simulated performance of the hybrid quantum computation architecture described in conjunction with FIGS. 3-5. The diagrams plot the normalized cost of the solution (solid line with open circles, left axis) as a function of the number of iterations of the iterative method described in conjunction with FIGS. 4 and 5 with a simulated quantum computational network 20 identical to the example shown in FIG. 2 for a system of eight linear binary equations wherein each equation comprises three variables (as can be seen in the caption). The diagrams further plot the ratio of solved equations (solid line without open circles, right axis "solution ratio"), wherein the thin lines represent different systems of linear equations (featuring different coefficients), and the thicker line represents the average solution ratio, both as a function of iterations.

FIGS. 6A-6C differ in the number of shared variables among the 8 equations, i.e. in FIG. 6A, no variables are shared between the equations (the equations are independent), while for FIG. 6C, two variables are shared, such that the system of linear equations can be written in the form $$\alpha_{00}x_0 + \alpha_{01}x_1 + \alpha_{02}x_2 = b_0,$$

$$\alpha_{10}x_1 + \alpha_{11}x_2 + \alpha_{12}x_3 = b_1,$$

$$\alpha_{20}x_2 + \alpha_{21}x_3 + \alpha_{22}x_4 = b_2,$$

$$\vdots \qquad \vdots \qquad \vdots \qquad \vdots$$

$$\alpha_{70}x_7 + \alpha_{71}x_8 + \alpha_{72}x_9 = b_9,$$

The system is solved in a simulated quantum computational network 20 with six qubits, i.e. three register qubits and three ancilla qubits, and 20 layers of qubit gates 14. As can be seen from the decay of the cost as well as the increase of the ratio of solved equations, the simulated quantum computational network 20 descends monotonously towards a minimum.

The inventors observed in their simulations that the ratio of solved equations can be further increased with an increased number of layers of quantum gates 14. The quantum computational network (QCN) gradient descent was performed using the "Cirq" simulator on a consumer grade processing unit and was accordingly limited in the number of simulated qubits/layers. However, as quantum hardware will enable a significantly faster determination of the gradient, the inventors expect that using a real quantum computer, the quantum architecture described above will enable the solution of problems including large linear binary systems of relations, e.g., with $10^5$ relations or more, faster than classical devices.

The skilled person will appreciate that the quantum computational network 20 has been described with variational single qubit gates with two eigenvalues for illustrative purposes. While single qubit gates often feature higher fidelity than multi-qubit gates and while it can also be advantageous to limit the number of variational quantum gates in each layer 24a, 24b to improve a convergence of the solution, in principle other types of variational quantum gates may be used.

In the more general case, the partial derivative may still be determined based on an evaluation of the quantum computational network 20 by conditionally applying the variational quantum gates and additional quantum gates $A_k$ based on the state of an ancilla qubit.

FIG. 7A illustrates another example of a flow diagram of a method for iteratively improving a solution a quantum computational network 20 for general variational quantum gates. The method comprises applying the layers 24a, 24b of quantum gates 14 with additional quantum gates $A_k$ conditionally applied based on the state of a second ancilla qubit, and determining the outcome state to evaluate a partial derivative of the layers 24a, 24b of quantum gates 14 with respect to the variable action $\theta_j$ of the variational parameters $\vec{\theta}$ (S22). The method further comprises determining a gradient of the cost function based on the partial derivative of the layers 24a, 24b of quantum gates 14 (S24), and updating the variational parameters $\vec{\theta}$ based on the gradient (S26).

The additional quantum gates $A_k$ should fulfill the equation $$\partial_{\theta_j} G = \sum_{k=1}^{K} \alpha_k A_k,$$

with K being a natural number (e.g., 2). The additional quantum gates $A_k$ may be applied following the conditional application of the respective variational gate conditionally on the state of the ancilla qubit, and the outcome state may be determined to evaluate a partial derivative of the layers of quantum gates 14 with respect to the variable action $\theta_j$ of the variational parameters $\vec{\theta}$.

For example, as illustrated in FIG. 7B, an ancilla qubit 42 in state |0> may be prepared in a superposition state by a first Hadamard gate 22a. The state of the qubits 44 in the qubit register 12 may then be conditionally subjected to the action of the variational quantum gate 46 during the evaluation of the quantum computational network 20, e.g., conditionally on the state of the ancilla qubit 42 being |0>. Subsequently, the resulting state of the qubits 44 in the qubit register 12 may be conditionally subjected to the action of the additional quantum gate 48, e.g. conditionally on the state of the ancilla qubit 42 being |1>. A second Hadamard gate 22b may then act on the state of the ancilla qubit 42 and the state of the ancilla qubit 42 may be measured by a measurement sensor 50.

The outcome of the quantum computation and the state of the ancilla 42 may be measured to obtain the expectation values $E_0$ and $E_1$ for the state of the ancilla being |0> and |1>, respectively, with probabilities $p_0$ and $p_1$ for each of the additional quantum gates $A_k$. The partial derivative may then be determined according to $$\partial_{\theta_j} f = \sum_{k=1}^{K} \alpha_k 2(p_0 E_0 - p_1 E_1)|_k.$$

Hence, in some embodiments, the method may comprise variational quantum gates 46 with more than two eigenvalues while the solution may be optimized with an iterative method similar to the one illustrated in FIG. 7A, 7B.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS

10 system
12 qubit register

25

14 plurality of quantum gates
16 measurement sensors
18 control system
20 quantum computational network
22, 22a, 22b Hadamard gates
24a, 24b layers
26 initial quantum computational network evaluation
28 cost function evaluation module
30 convergence/threshold evaluation module
32 hybrid gradient evaluation
34 quantum computational network evaluations for shifted variational parameters
36 partial derivative evaluation module
38 update module
40 quantum computational network evaluation for updated variational parameters
42 ancilla qubit
44 qubit register state
46 variational quantum gate
48 additional quantum gate
50 ancilla measurement device All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of using a hybrid quantum computation system for finding a solution to a system of linear binary relations, the hybrid quantum computation system comprising a quantum computational network including a set of quantum gates implemented on quantum hardware, the set of quantum gates comprising a plurality of variational quantum gates with variable actions acting on a plurality of computation qubits of the quantum computational network, the variable actions forming a set of variational parameters $\vec{\theta}$, wherein the method comprises:

at a control system operably coupled to the quantum computational network:

initializing the plurality of computation qubits on a qubit register of the quantum computational network, the plurality of computation qubits comprising a plurality of ancilla qubits and a plurality of register qubits;

causing the quantum computational network to apply the set of quantum gates to the computation qubits and measuring an outcome state using measurement sensors of the quantum computational network;

controlling the quantum computational network to determine a solution for the system of linear binary relations associated with the variational parameters $\vec{\theta}$ based on a plurality of solution candidates for the individual relations of the system of linear binary relations encoded in the outcome state, wherein a state of the register qubits is associated with a select one of the binary relations and a state of the ancilla qubits is associated with a solution candidate for the select one of the binary relations;

iteratively improving the solution to the system of linear binary relations by:

controlling the quantum computational network to determine a plurality of partial derivatives of the set of quantum gates with respect to the variational parameters $\vec{\theta}$, including adjusting the at least one of the variational parameters $\vec{\theta}$ and receiving data from the measurement sensors of an associated outcome state, determining a gradient of a cost function for the system of linear binary relations based on the plurality of partial derivatives of the set of quantum gates on classical hardware, wherein the cost function associates a cost to a solution candidate for the system of linear binary relations encoded in the outcome state of the computation qubits, wherein the cost comprises an individual relation penalty associated with a mismatch between the sides of each of the relations and an inconsistency penalty associated with a clash of the value of the same variable in different linear binary relations after repeatedly measuring the computation qubits; and updating the variational parameters $\vec{\theta}$ based on the gradient as feedback to the quantum computational network implemented on quantum hardware.

2. The method according to claim 1, wherein the individual relation penalty is a continuous and non-negative function of the mismatch between the sides of each of the relations, wherein the individual relation penalty is in particular an even polynomial of the mismatch, and preferably based on the squared mismatch.

3. The method according to claim 1, wherein the cost comprises the calculation of the cost expression C $$C = C_{rel} + \lambda C_{inc}$$

wherein $C_{rel}$ is the individual relation cost, wherein $C_{inc}$ is the inconsistency penalty, and wherein $\lambda$ is a parameter chosen such that for a given system of linear binary relations the term $\lambda C_{inc}$ is larger than $C_{rel}$ on average for random variational parameters $\vec{\theta}$.

4. The method according to claim 1, wherein the inconsistency penalty is based on a probability of measuring different outcome states of the same variable when determining the state of the same variable based on the state of the computation qubits for different states of the register qubits, wherein the inconsistency penalty is in particular based on the expression $$C_{inc} = \sum_{j=0}^{N_{var}-1} \left( 1 - \prod_{i \in I_j, j=f(i,k)} P(x_{f(i,k)} = 1) - \prod_{i \in I_j, j=f(i,k)} P(x_{f(i,k)} = 0) \right),$$

wherein $I_j$ is the subset of linear binary relations comprising the same variable $x_j$, $f(i, k)$ is a predetermined mapping between a state of the ancilla qubits and the associated solution for the same variable $x_j$ in a relation i encoded in the state of the register qubits, the associated solution for the same variable $x_j$ being associated with index k in the relation i, for a number of $N_{var}$ variables, and $P(x_j=1/0)$ is the probability of measuring the outcome state of the kth ancilla qubit corresponding to a value of 1/0 in the relation i.

5. The method according to claim 1, wherein the computation qubits comprise log N register qubits and m ancilla qubits, wherein the system is a system of N linear binary relations, with each of the N linear binary relations having at most m different variables.

6. The method according to claim 5, wherein the computational basis states of the ancilla qubits are associated with all possible solution candidates for the m variables in the respective linear binary relation associated with the state of the register qubits.

7. The method according to claim 5, wherein the system of relations is a system of N linear binary equations each having at most m different variables, wherein the individual relation cost $C_{rel}$ is in particular based on the expression $$C_{rel} = \sum_{i=0}^{N-1} \sum_{S=0}^{2^m-1} |\gamma_{iS}(\vec{\theta})|^2 \left( \sum_{k=0}^{m-1} a_{i,f(i,k)} s_k - b_i \right)^2,$$

wherein $|\gamma_{iS}(\vec{\theta})|^2$ is the probability of measuring a state S of the ancilla qubits for a given state i of the register qubits, wherein the state i is associated with a certain linear equation i, wherein $a_{i,f(i,k)}$ is the coefficient by which the kth variable in the linear equation i is multiplied, wherein $s_k \in \{0, 1\}$ in accordance with the solution candidate associated with state S, and wherein $b_i$ is a constant value of the linear equation i.

8. The method according to claim 1, the method further comprising determining a maximum number of variables m in each of the N linear binary relations.

9. The method according to claim 1, wherein controlling the quantum computational network to determine the partial derivative of the set of quantum gates with respect to the variational parameters $\vec{\theta}$ with the quantum computational network comprises at least one of:

applying the set of quantum gates with shifted variational parameters $\vec{\theta}*$, the shifted variational parameters $\vec{\theta}*$ comprising a subset of the variational parameters $\vec{\theta}$ shifted by a shift and measuring the associated outcome state for the shifted variational parameters $\vec{\theta}*$ to evaluate a partial derivative with respect to the subset of the variational parameters $\vec{\theta}$; and conditionally applying the set of quantum gates and additional quantum gates $A_k$ based on the state of a derivation ancilla qubit, the additional quantum gates fulfilling the equation $$\partial_{\theta_j} G = \sum_{k=1}^{K} \alpha_k A_k,$$

with K being a real positive value, and measuring the outcome state in order to evaluate a partial derivative of the set of quantum gates with respect to the variable action $\theta_j$ of the variational parameters $\vec{\theta}$.

10. The method according to claim 9, wherein the method comprises, at the control system, causing the quantum computational network to sequentially apply the layers of quantum gates with shifted variational parameters $\vec{\theta}*$ twice for each variational gate, the shifted variational parameters $\vec{\theta}*$ comprising a subset of the variational parameters $\vec{\theta}$ shifted by symmetric shifts for each variational gate, to evaluate a partial derivative with respect to each variable action of the variational parameters $\vec{\theta}$ for determining the gradient before updating the variational parameters $\vec{\theta}$, wherein the two eigenvalues of the variational quantum gates are in particular $\pm 1/2$ and the shift is in particular $\pm \pi/2$.

11. The method according to claim 1, wherein the variational parameters $\vec{\theta}$ are updated based on an update function of a moving average over the gradient of the cost and of a moving average over the squared gradient of the cost, wherein the update function is in particular substantially proportional to the moving average over the gradient of the cost function and substantially inversely proportional to the square root of the moving average over the squared gradient of the cost function, wherein the moving average over the gradient of the cost function and of a moving average over the squared gradient of the cost function are preferably exponentially decaying moving averages.

12. The method according to claim 11, wherein the update function at an iterative step t is mathematically equivalent to:

$$\vec{\theta}_{t+1} = \vec{\theta}_t - \frac{\alpha}{\sqrt{v_t} + \epsilon} m_t$$

with $m_t$ being proportional to the moving average over the gradient of the cost function and $v_t$ being proportional to the moving average over the squared gradient of the cost function, $\alpha$ being a learning rate hyperparameter, and $\in$ being a small number with respect to an expected magnitude of the update, wherein in particular $$m_t = \frac{\beta_1 m_{t-1} + (1 - \beta_1)\nabla C|_{\vec{\theta}=\vec{\theta}_t}}{1 - \beta_1^t}$$

and $$v_t = \frac{\beta_2 v_{t-1} + (1 - \beta_2)\left(\nabla C|_{\vec{\theta}=\vec{\theta}_t}\right)^2}{1 - \beta_2^t},$$

with $\beta_1$ and $\beta_2$ being real values between 0 and 1, $$\nabla C|_{\vec{\theta}=\vec{\theta}_t}$$

being a gradient determined at iterative step t based on the outcome state for the shifted variational parameters $\vec{\theta}$*, and $$\left(\nabla C|_{\vec{\theta}=\vec{\theta}_t}\right)^2$$

being the element square of the gradient determined at iterative step t, while $m_{t-1}$ and $v_{t-1}$ are the previously determined values at time step t-1 of $m_t$ and $v_t$, respectively, and $m_0$ and $v_0$ are zero.

13. The method according to claim 1, wherein the set of quantum gates comprises a plurality of layers of quantum gates applied in sequence, wherein the plurality of layers comprise the same arrangement of quantum gates in each layer, and wherein the quantum gates in each layer in particular comprise a plurality of multi-qubit quantum gates which together act on all qubits of the qubit register, wherein each layer of quantum gates in particular comprises a set of variational qubit gates acting on each qubit of the qubit register, wherein the set of variational qubit gates preferably a set of variational single qubit gates, and/or wherein the number of variational qubit gates in each layer is in particular substantially equal to the number of qubits in the qubit register.

14. A hybrid quantum computation system for finding a solution to a system of linear binary relations, comprising:

a quantum computational network implemented on quantum hardware comprising:

a qubit register comprising a plurality of qubits, including a plurality of register qubits and ancilla qubits, a set of quantum gates selectively acting on the qubits of the qubit register including multi-quantum gates acting on multiple qubits of the qubit register, wherein the quantum gates comprise a plurality of variational quantum gates with respective variable actions onto the qubits of the qubit register, wherein the variable actions form a set of variational parameters $\vec{\theta}$; and measurement sensors configured to measure the state of the plurality of qubits of the qubit register; and a control system operably coupled to the quantum computational network, the control system configured to:

initialize the qubits of the qubit register;

causing the quantum computational network to apply the set of quantum gates to the qubits of the qubit register with the variational parameters $\vec{\theta}$ for determining an outcome state;

controlling the quantum computational network to determine a partial derivative of the set of quantum gates with respect to at least one of the variational parameters $\vec{\theta}$, including adjusting the at least one of the variational parameters $\vec{\theta}$ and receiving data from the measurement sensors of an associated outcome state;

determine a gradient of a cost function based on the partial derivative, wherein the cost function associates a cost to a solution encoded in the outcome state on classical hardware, wherein a state of the register qubits is associated with a select one of the binary relations and a state of the ancilla qubits is associated with a solution candidate for the select one of the binary relations, and wherein the cost comprises an individual relation penalty associated with a mismatch between the sides of each of the relations and an inconsistency penalty associated with a clash of the value of the same variable in different linear binary relations after repeatedly measuring the computation qubits; and update the variational parameters $\vec{\theta}$ based on the gradient as feedback to the quantum computational network implemented on quantum hardware.

\* \* \* \* \*